United States Patent
East et al.

(10) Patent No.: US 9,678,639 B2
(45) Date of Patent: Jun. 13, 2017

(54) VIRTUAL MOUSE FOR A TOUCH SCREEN DEVICE

(71) Applicant: Bentley Systems, Incorporated, Exton, PA (US)

(72) Inventors: Daniel V. East, Lititz, PA (US); Mark E. Dane, Philadelphia, PA (US)

(73) Assignee: Bentley Systems, Incorporated, Exton, PA (US)

(*) Notice: Subject to any disclaimer, the term of this patent is extended or adjusted under 35 U.S.C. 154(b) by 210 days.

(21) Appl. No.: 14/164,516

(22) Filed: Jan. 27, 2014

(65) Prior Publication Data

US 2015/0212698 A1  Jul. 30, 2015

(51) Int. Cl.
*G06F 3/0484* (2013.01)
*G06F 3/0488* (2013.01)

(52) U.S. Cl.
CPC ........ *G06F 3/04842* (2013.01); *G06F 3/0488* (2013.01)

(58) Field of Classification Search
CPC .......................... G06F 3/04842; G06F 3/0488
See application file for complete search history.

(56) References Cited

U.S. PATENT DOCUMENTS

| | | | | |
|---|---|---|---|---|
| 5,835,079 A | * | 11/1998 | Shieh | G06F 3/0488 345/156 |
| 6,448,964 B1 | * | 9/2002 | Isaacs | G06F 3/0362 345/419 |
| 8,462,134 B2 | | 6/2013 | Matejka et al. | |
| 8,786,569 B1 | * | 7/2014 | Silverberg | G06F 3/0481 345/173 |
| 2002/0191029 A1 | * | 12/2002 | Gillespie | G06F 3/0488 715/810 |
| 2003/0107607 A1 | * | 6/2003 | Nguyen | G06F 3/04883 715/863 |
| 2006/0085763 A1 | * | 4/2006 | Leavitt | G06F 3/04817 715/810 |
| 2006/0132460 A1 | * | 6/2006 | Kolmykov-Zotov | G06F 3/04812 345/173 |

(Continued)

FOREIGN PATENT DOCUMENTS

WO  WO-2013/093409 A1  6/2013

OTHER PUBLICATIONS

Benko, Hrovje, et al., "Precise Selection Techniques for Multi-Touch Screens," CHI Proceedings 2006, Conference on Human Factors in Computing Systems, Montreal, Quebec, Canada, Apr. 22-27, 2006, pp. 1263-1272.

(Continued)

*Primary Examiner* — Eric J Bycer
(74) *Attorney, Agent, or Firm* — Cesari and McKenna, LLP; James A. Blanchette

(57) ABSTRACT

In one embodiment, a technique is provided for using a virtual mouse to interact with an electronic device. The virtual mouse is displayed on a touch screen display of the electronic device. The virtual mouse includes a pointer identifying a position, and a control region positioned proximate to, but offset from, the pointer. The control region includes a movement area for receiving touch input that is mapped to movement of the virtual mouse, and one or more buttons for performing one or more actions related to an item or point located at the identified position. In use, when touch input is received in the movement area of the virtual mouse, the virtual mouse, including the pointer, is moved. When, a button of the one or more buttons is pressed, an action is performed that is related to the item or point located at the identified position.

24 Claims, 12 Drawing Sheets

(56) References Cited

U.S. PATENT DOCUMENTS

| | | | |
|---|---|---|---|
| 2006/0267966 A1* | 11/2006 | Grossman | G06F 3/0346 345/179 |
| 2009/0251410 A1 | 10/2009 | Mori et al. | |
| 2009/0288043 A1 | 11/2009 | Willis | |
| 2010/0214218 A1* | 8/2010 | Vaisanen | G06F 3/0488 345/163 |
| 2010/0302155 A1 | 12/2010 | Sands et al. | |
| 2011/0018806 A1* | 1/2011 | Yano | G06F 3/0488 345/163 |
| 2011/0239153 A1 | 9/2011 | Carter et al. | |
| 2012/0200603 A1 | 8/2012 | Backer et al. | |
| 2013/0328779 A1* | 12/2013 | Butner | G06F 3/0488 345/163 |

OTHER PUBLICATIONS

"Mouse Emulation for Digitizer/Touch Panel," IBM Technical Disclosure Bulletin, vol. 33, No. 7, IBM Corp, Dec. 1990, pp. 216-217.

"Notification of Transmittal of the International Search Report and the Written Opinion of the International Searching Authority, or the Declaration," International Filing Date: Sep. 29, 2014, International Application No. PCT/US2014/058082, Applicant: Bentley Systems, Incorporated, Date of Mailing: Dec. 10, 2014, pp. 1-15.

Albinsson, Par-Anders, et al., "High Precision Touch Screen Interaction," CHI '03 Proceedings of the SIGCHI Conference on Human Factors in Computing Systems, ACM, New York, NY, Apr. 3, 2003, pp. 105-112.

Benko, Hrvoje, et al., "Precise Selection Techniques for Multi-Touch Screens," CHI '06 Proceedings of the SIGCHI Conference on Human Factors in Computing Systems, ACM, New York, NY, Apr. 22, 2006, pp. 1263-1272.

Scoditti, Adriano, et al., "TouchOver: Decoupling Positioning from Selection on Touch-based Handheld Devices," IHM '11 23rd French Speaking Conference on Human-Computer Interaction, ACM, New York, NY, No. 6, Oct. 24, 2011, pp. 1-4.

Yang, Xing-Dong, et al., "TouchCuts and TouchZoom: Enhanced Target Selection for Touch Displays using Finger Proximity Sensing," CHI 2011 Session-Touching 3-Sensing, Vancouver, BC, Canada, ACM, May 7-12, 2011, pp. 2585-2594.

\* cited by examiner

VIRTUAL MOUSE FOR A TOUCH SCREEN DEVICE

BACKGROUND

Technical Field

The present disclosure relates generally to user interaction with an electronic device having a touch screen display, and a more specifically to precision selection of items and/or points using an electronic device having a touch screen display.

Background Information

Touch screen displays are becoming increasingly common on a variety of types of electronic devices. For example, most mobile devices (e.g., smartphones, tablet computers, etc.) employ some form of touch screen display, and use touch input as their primary mode of user input. By its very nature, touch input may be quick and intuitive, making it well suited for many types of applications. However, for some types of applications, touch input may be less than ideal. In its native form, touch input often lacks the level of detail and precision provided by traditional keyboard and mouse based input. A high level of detail and precision may be important to some applications, for example, to computer aided design (CAD) applications, where a user may be called upon to discriminate between nearby items or points, to select a desired one.

The lack of detail and precision in touch based input stems from a variety of sources. One source is the reduced number of input types that are possible with touch based input, as compared to keyboard and mouse based input. With a keyboard and mouse, a user may enter a large number of distinct types of input, using the movement sensor of the mouse, the various buttons on the mouse, the scroll wheel of the mouse, and the various keys of the keyboard, alone, or in combinations. Each of these distinct types of input can be directly mapped to types of actions in an application. However, with touch based input, a user generally has fewer types of input they may enter, being limited to movements recognized on the touch screen display. For example, while a user may tap, hold, pinch, drag, swipe, etc., on the touch screen display, there are a fairly limited number of different things the user can do. This may pose a problem when designing a user interface for an application. While a designer may desire to directly map a variety of actions supported by the application to distinct types of input, there may simply be more actions than input types.

Another source of the lack of detail and precision stems from the typical lack of persistent position tracking on touch screen displays. With a typical keyboard and mouse based user interface, a cursor is persistently displayed to designate a position. Even if the user is not moving the mouse, the cursor is still shown, and its lingering presence can be used to trigger actions. For example, a "hover over" may be detected, where the cursor is maintained over an object for a short period of time. This may trigger an action (e.g., displaying information, such as a "tool tip", about the object). However, this type of interaction is typically not available on touch screen displays. Traditionally, on touch screen displays, position is only designated momentarily, when a user touches the screen. As such, interactions such as "hover overs" are generally not enabled.

Still another source of the lack of detail and precision stems from ambiguity in position designation on touch screen displays. With a mouse, a user can generally select a single pixel in a user interface. A user can see the cursor, and move it to exactly where they desire, making tiny adjustments as needed. However, with a touch screen display, this type of operation is generally not possible. When a user touches the screen, their finger (or the stylus, if one is used) typically obscures their view of the position they are trying to designate. The position is somewhere under their finger (or the stylus tip), but the user cannot generally see where. Further, the entire area of contact is generally registered as being touched, rather than a distinct point. Algorithms must be employed to try to guess where in this area the user really intended to designate. Given this guesswork, when items or points are close together, a user may have to repeatedly touch the display screen, until they happen upon the desired result.

Accordingly, there is a need for improved techniques for selection of items and/or points using a touch-screen display. While this need may be applicable to a variety of types of applications executing on electronic devices (e.g., mobile devices), it may be particularly acute for CAD applications executing on mobile devices.

SUMMARY

In one embodiment, a virtual mouse is provided for interacting with an electronic device (e.g., a mobile device) having a touch screen display. The virtual mouse, when displayed on the touch screen display, may include a pointer, and a control region proximate to, but offset from, the pointer. The pointer identifies a position of an item (e.g., an element of a computer aided design (CAD) model) or a point (e.g., a point within a view of the CAD model) displayed in the user interface of an application (e.g., a CAD application). In one implementation, the pointer is represented as a crosshairs, whose appearance may change depending upon whether it is being used to select an item or a point. The control region of the virtual mouse may include a movement area for receiving touch input, and one or more buttons for performing actions related to the item or point identified by the pointer. Input (e.g., a touch and drag) received in the movement area may be mapped to movement of the entire virtual mouse. As such, by interacting with the movement area, a user may move the pointer such that the pointer is displayed at a position that identifies a desire item or point, with the movement area and buttons displayed proximate to, but offset from, that position. By selecting one of the buttons, a user may trigger actions related to the item or point. The actions may include selecting the item or point, deselecting the item or point, changing one or more settings related to the item or point, or another type of action possible in the user interface of the application. The number and functions of the buttons may vary depending on the present usage of the virtual mouse.

Among other benefits, the virtual mouse may enable more detailed and precise control than generally possible on a touch screen display. Since the virtual mouse provides buttons whose number and functions may vary based on usage, a greater number of input types can be supported than with traditional touch input techniques. Further, the presence of the pointer may provide persistent position tracking, allowing user interface interactions such as "hover over". Still further, by utilizing an offset movement area, the user's view of the pointer is un-obstructed, allowing the user to readily discriminate between nearby items or points.

It should be understood that a virtual mouse may include a variety of additional or alternative features, which provide additional or alternative advantages. This Summary is intended simply as an introduction to the reader, and does not indicate or imply that the features mentioned herein cover all aspects of the invention, or are necessary or essential aspects of the invention.

BRIEF DESCRIPTION OF THE DRAWINGS

The detailed description below refers to the accompanying drawings of example embodiments, of which.

DETAILED DESCRIPTION

Figure 1:
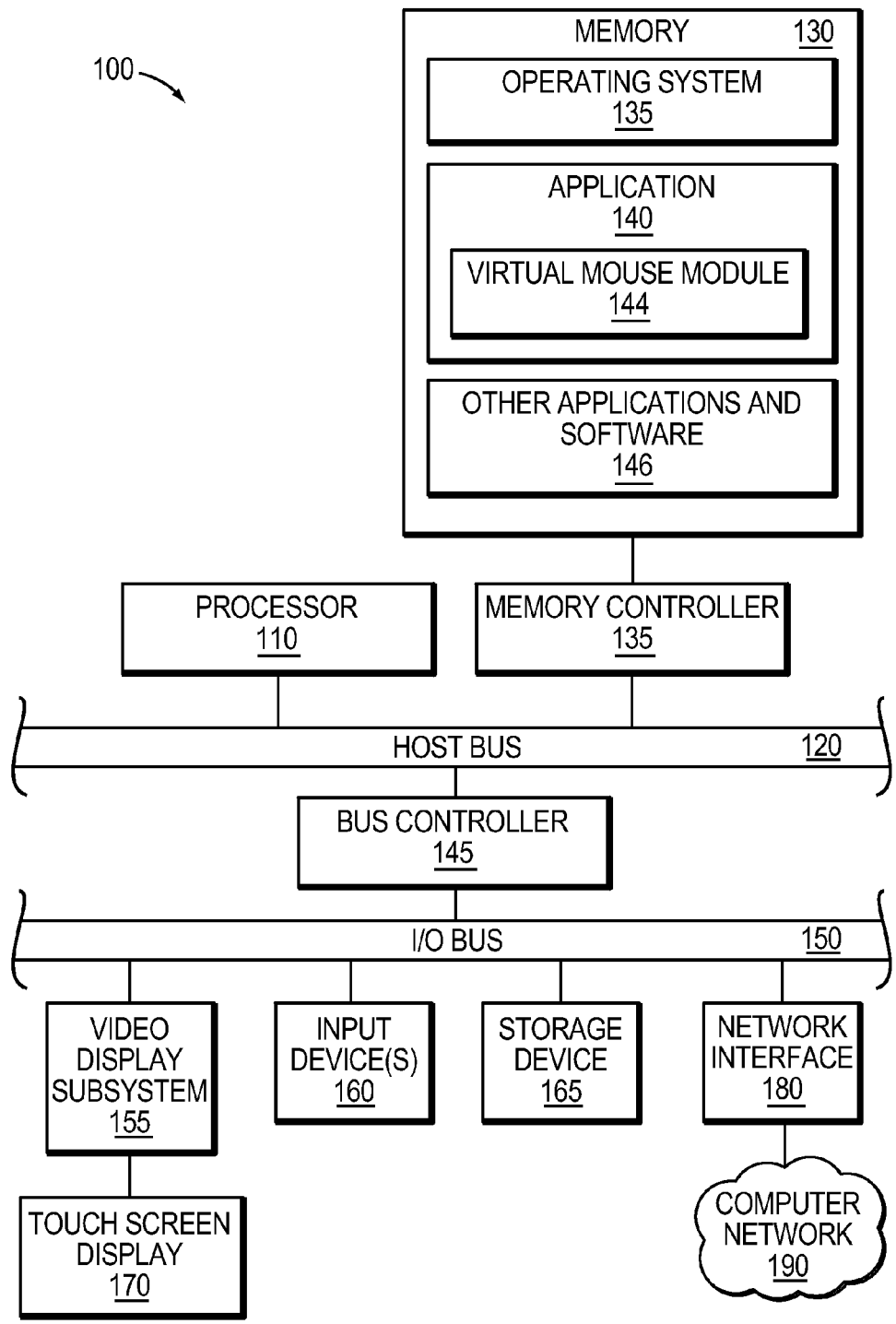
FIG. 1 is a block diagram of an example electronic device, for example, a mobile device, on which a virtual mouse may be implemented.

FIG. 1 is a block diagram of an example electronic device 100, for example, a mobile device, on which a virtual mouse may be implemented. As used herein, the term "mobile device" refers to a computing device that is adapted to be transported on one's person. Devices such as tablet computers and smartphones are generally considered mobile devices. Devices such as desktop computers are generally not considered mobile devices. The electronic device (e.g., mobile device) 100 may include at least one processor 110 coupled to a host bus 120. A volatile memory 130, such as a random access memory (RAM), may be coupled to the host bus 120 via a memory controller 125. The memory 130 may store at least a portion of executable instructions for an operating system 135 (e.g., a Windows®, Android®, or iOS® operating system), an application 140 (e.g., a computer aided design (CAD) application), and a virtual mouse module 144, as well as other applications and software 146. In an implementation where the application is a CAD application, the CAD application may be any of a variety of types of CAD model creation, viewing and/or analysis application. In one implementation, the CAD application may be the Bentley® Navigator V8i application, available from Bentley Systems Inc.

The virtual mouse module 144 may include executable instructions to implement a virtual mouse. In one implementation, the virtual mouse module 144 is part of the application 140 (e.g., the CAD application) itself. In such a case, use of the virtual mouse may be confined to be within a user interface of the application 140. Alternatively, the virtual mouse module 144 may be implemented as a standalone application, or as part of the operating system 135. In such a case, it may be possible to use the virtual mouse across user interfaces of multiple applications, for example, in both the application 140 (e.g., the CAD application) and the other applications and software 146, as they are executed on the electronic device 100. The virtual mouse module 144 may interact with a number of application program interfaces (APIs) and functions (not shown) of the application 140, operating system 135, and potentially other applications and software 146. In an example where the operating system 135 is a Windows® operating system, the APIs and functions may include the well known SetCapture, ReleaseCapture, GetCursorPos, SetCursorPos, GetPhysicalCursorPos, SetPhysicalCursorPos, and SendInput functions of the Windows® operating system. In an example where the operating system 135 is an Android® or iOS® operating system, the APIs and functions may include components that have analogous functionality.

The host bus 120 of the electronic device 100 may be coupled to an input/output (I/O) bus 150 through a bus controller 145. A video display subsystem 155 that includes a touch screen display 170 may be coupled to the I/O bus 150. The touch screen display 170 may show a user interface of the application 140 (and potentially of the other applications and software 146) with which the virtual mouse may be utilized. The touch screen display screen 170 may be designed to receive touch input from a user (e.g., via their finger(s) and/or a stylus), which includes single-touch gestures (involving one point of contact with the touch screen display) and/or multi-touch gestures (involving multiple points of contact with the touch screen display).

In addition to the touch screen display 170, one or more other types of input devices 160 may be included in mobile device and coupled to the I/O bus 150. For example, various physical buttons or sensors (e.g., an orientation sensor, a camera, etc.) may be included. A persistent storage device 165, such as a solid-state drive, flash memory, or other type or persistent data store, may be coupled to the I/O bus 150, and used to persistently store executable instructions that are loaded into the volatile memory 130 when needed. For example, executable instructions for the operating system 135, application 140, virtual mouse module 144, and the other applications and software 146 may be stored thereon, and then loaded when needed. The I/O bus 150 may further be coupled to a network interface 180, for example a wireless network interface, which interfaces with a computer network 190. The computer network 190 may allow communication between the electronic device 100 and other electronic devices, using any of a number of well known networking protocols, to permit a variety of distributed, collaborative or remote computing configurations.

Figure 2:
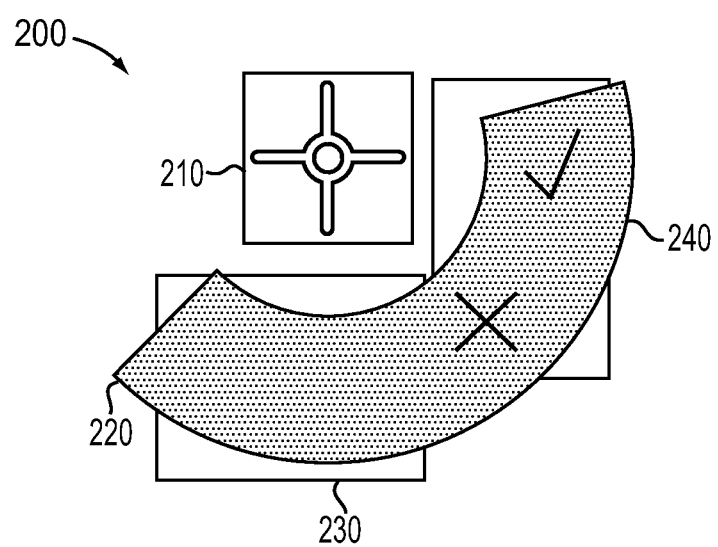
FIG. 2 is a diagram of an example virtual mouse that may be displayed on a touch screen display.

FIG. 2 is a diagram of an example virtual mouse 200 that may be displayed on a touch screen display. The virtual mouse 200 includes a pointer 210 and a control region 220 proximate to, but offset from, the pointer. The pointer 210 identifies a position of an item or a point displayed in a user interface on the touch screen display. In an implementation where the application 140 is a CAD application, the user interface may be a user interface of the CAD application, the item may be an element of a CAD model shown in the user interface of the CAD application, and the point may be a point within a view of the CAD model. In other implementations, the item or point may take on different forms.

The pointer 210 may be represented as a crosshairs or other designator of position. In some cases, the appearance of the pointer 210 may dynamical change, depending on the usage of the virtual mouse 200, for example, based on a task being performed with the virtual mouse. The differing appearance may include multiple styles of crosshairs (e.g., an open centered crosshair, a closed center crosshair, etc.), different colors of crosshairs, entirely different pointer styles, etc.

The control region 220 may include a movement area 230 for receiving touch input, and one or more buttons 240 for performing actions related to the item or point identified by the pointer 210. The movement area may be sized to accommodate a user's fingertip, for example, be about 7-9 mm in diameter. Touch input (e.g., a touch and drag) in the movement area 230 may be mapped to movement of the entire virtual mouse 200, such that the pointer 210, movement area 230, and the buttons 240, move together. The movement area 230 may be maintained proximate to, but offset from, the pointer 210 as any movement occurs.

The buttons 240 may be used to trigger actions related to the item or point disposed at the position identified by the pointer 210. The actions may include selecting the item or point, deselecting the item or point, displaying or changing one or more settings related to the item or point, or another type of action. In an implementation where the application 140 is a CAD application, the action may be to select an element of a CAD model or a point within a view of the CAD model, deselect the element or point, display or change properties of the element or point, or another type of CAD specific action.

Depending on the current usage of the virtual mouse 200, the number of buttons 240, their type, and the actions they trigger, may vary. Similarly, depending on the item or point that may be at the position identified by the pointer 210, the number of buttons 240, their type, and the actions they trigger may change. In such manner, the nature of the buttons 240 that are provided may be responsive to both a current usage and the item or point at the position identified by the pointer 210. In some cases, no buttons 240 may be displayed, for example, where no action is appropriate given the current usage or the item or point at the position. In an implementation where the application 140 is a CAD application, the current usage may be, for example, a measurement operation involving an element of the CAD model or one or more points within the view of the CAD model, such as a volume measurement operation, a distance measurement operation, etc.

Figure 3:
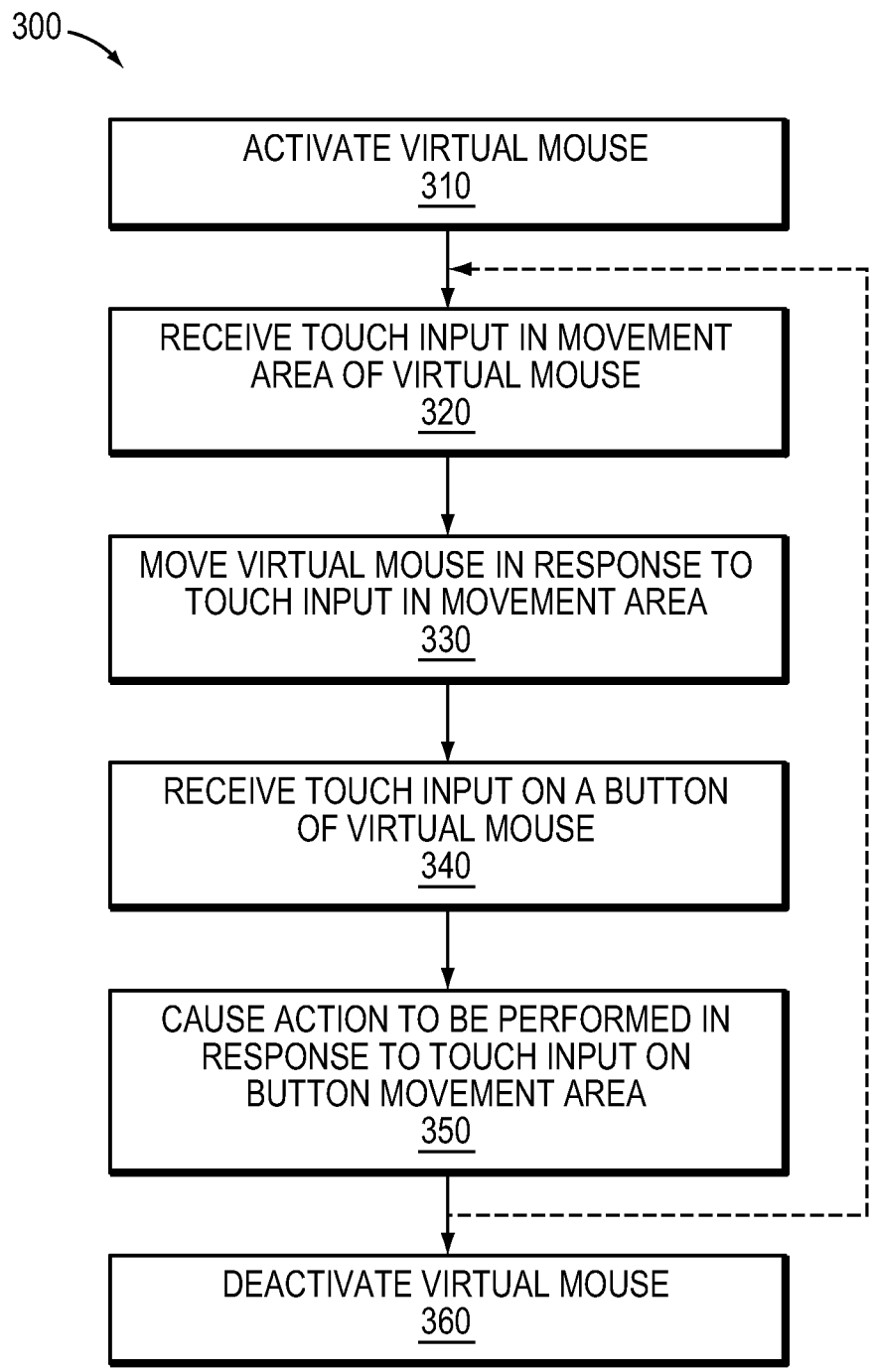
FIG. 3 is a flow diagram of an example sequence of steps for using a virtual mouse to interact with an electronic device (e.g., a mobile device) to perform certain operations.

FIG. 3 is a flow diagram of an example sequence of steps 300 for using a virtual mouse 200 to interact with an electronic device (e.g., a mobile device) to perform certain operations. At step, 310, the virtual mouse 200 is activated. When activated, the virtual mouse module 144 may interact with the operating system 135, the application 140 (e.g., the CAD application) and/or the other applications and software 146, to cause the virtual mouse 200 to be displayed on the touch screen display 170, for example, superimposed over a portion of a user interface of the application 140 and/or the other applications and software 146. Activating the virtual mouse 200 may coincide with entering a certain mode, for example, a precision selection mode, that is adapted for receiving more precise input than generally possible with a normal interface. The virtual mouse may be activated in response to a gesture on the touch screen display 170 (e.g., a two finger tap), a selection in a context menu, or some other type of touch input.

Once activated, the virtual mouse 200 may be utilized. At step 320, touch input (e.g., a touch and drag) may be received in the movement area 230 of the virtual mouse 200, indicating a user's desire to move the virtual mouse. At step 330, in response to the touch input in the movement area 230, the virtual mouse module 144 may move the virtual mouse 200, including the pointer 210, to track the supplied input. Eventually, the pointer 210 may be disposed over a desired item or point (e.g., an element of a CAD model or a point within a view of the CAD model).

At step 340, touch input (e.g., a touch) is received on a button of the one or more buttons 240. At step 350, in response to the touch input on the button, the virtual mouse module 144 interacts with the application 140 and/or the other applications and software 146, to cause an action related to the item or point to be performed. For example, the item or point may be selected.

Steps 320-350 may be repeated to move the virtual mouse about, to identify different items or points, and to perform different actions. Eventually, at step 360, when the virtual mouse 200 is no longer needed, the virtual mouse may be deactivated and removed from touch screen display 170. Similar to activation, the virtual mouse may be deactivated in response to a gesture on the touch screen display 170, for example, a one finger tap away from the virtual mouse 200, a selection in a context menu, or some other type of touch input. In some cases, the virtual mouse 200 may be deactivated automatically, for example, in response to an action being performed.

Figure 4:
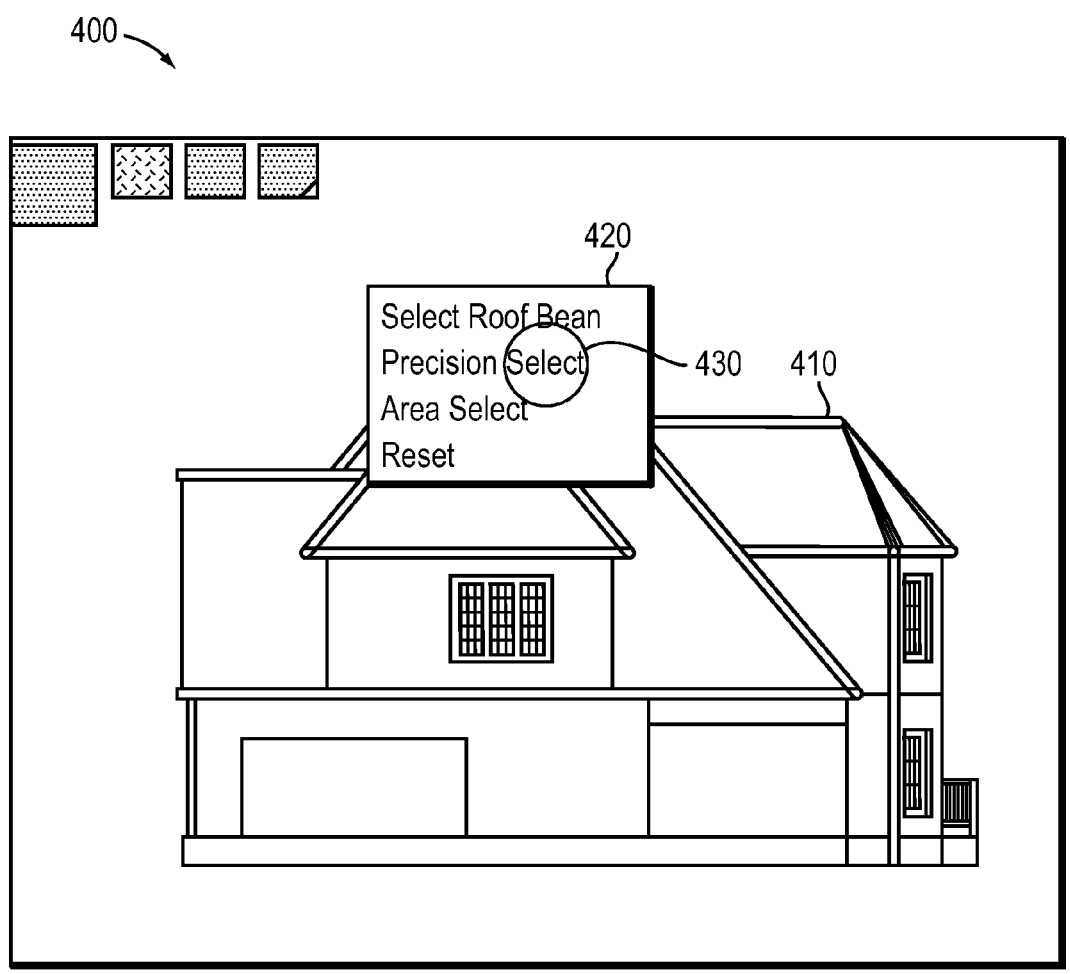
FIG. 4 is a screen shot of a user interface of an example CAD application, illustrating an example way of activating the virtual mouse.

FIG. 4 is a screen shot 400 of a user interface of an example CAD application, illustrating an example way of activating the virtual mouse 200. A view (e.g., an elevation) 410 of a building derived from a CAD model is shown in the user interface. The user may trigger the display of a context menu 420 with touch input (e.g., a hold gesture). The context menu 420 may be displayed about the position of the user's hold, and provide a number of selectable options, including an option to enter a precision selection mode in which the virtual mouse 200 is used. The user may select (e.g., touch) that option (the touch being represented by marker 430) to enter the precision selection mode, and activate the virtual mouse 200.

Figure 5:
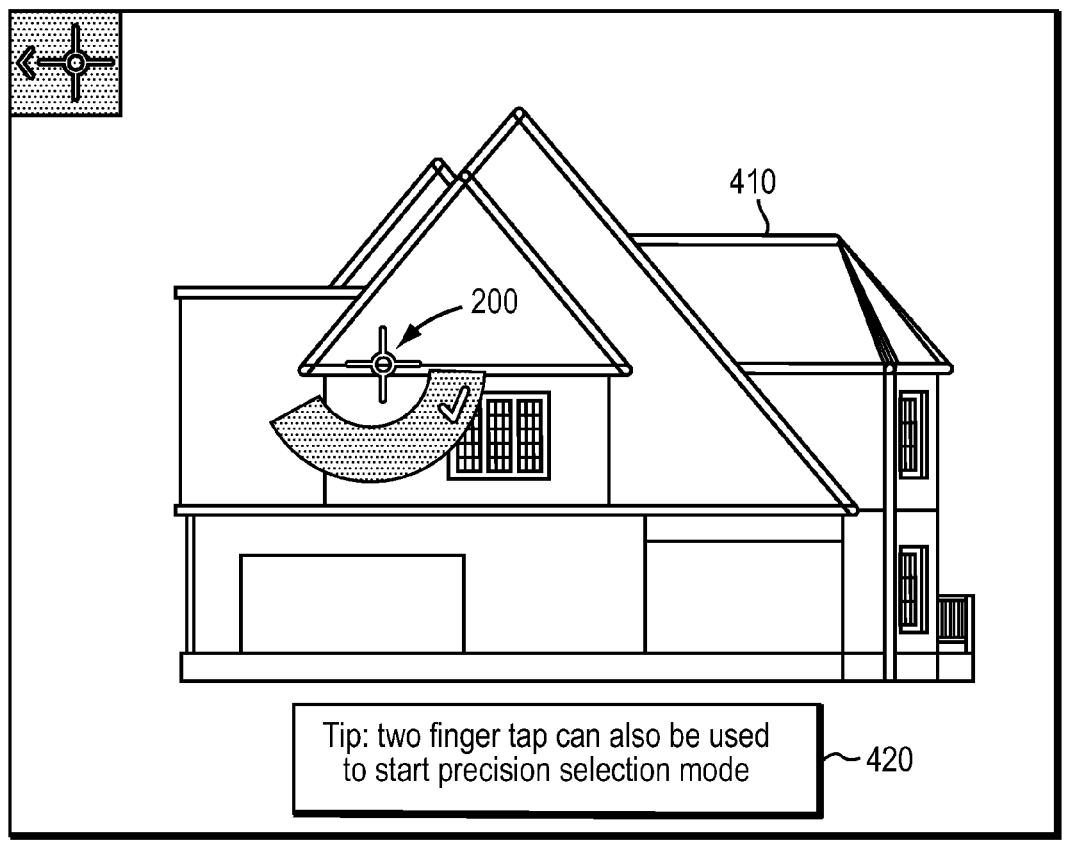
FIG. 5 is a screen shot of the user interface from FIG. 4, updated to show the virtual mouse after activation.

FIG. 5 is a screen shot 500 of the user interface from FIG. 4, updated to show the virtual mouse 200 after activation. The virtual mouse 200 may initially be positioned where the context menu 430 was previously displayed, superimposed upon a portion of the view (e.g., elevation) 410 of the building. In addition, information 420 about using the virtual mouse 200 may be displayed, at least upon the first few uses of the virtual mouse. The information 420 may include tips regarding alternative ways of activating the virtual mouse. For example, a tip may be provided reminding the user that a gesture, for example, a two finger tap, may be used to activate the virtual mouse by entering a precision selection mode.

Figure 6:
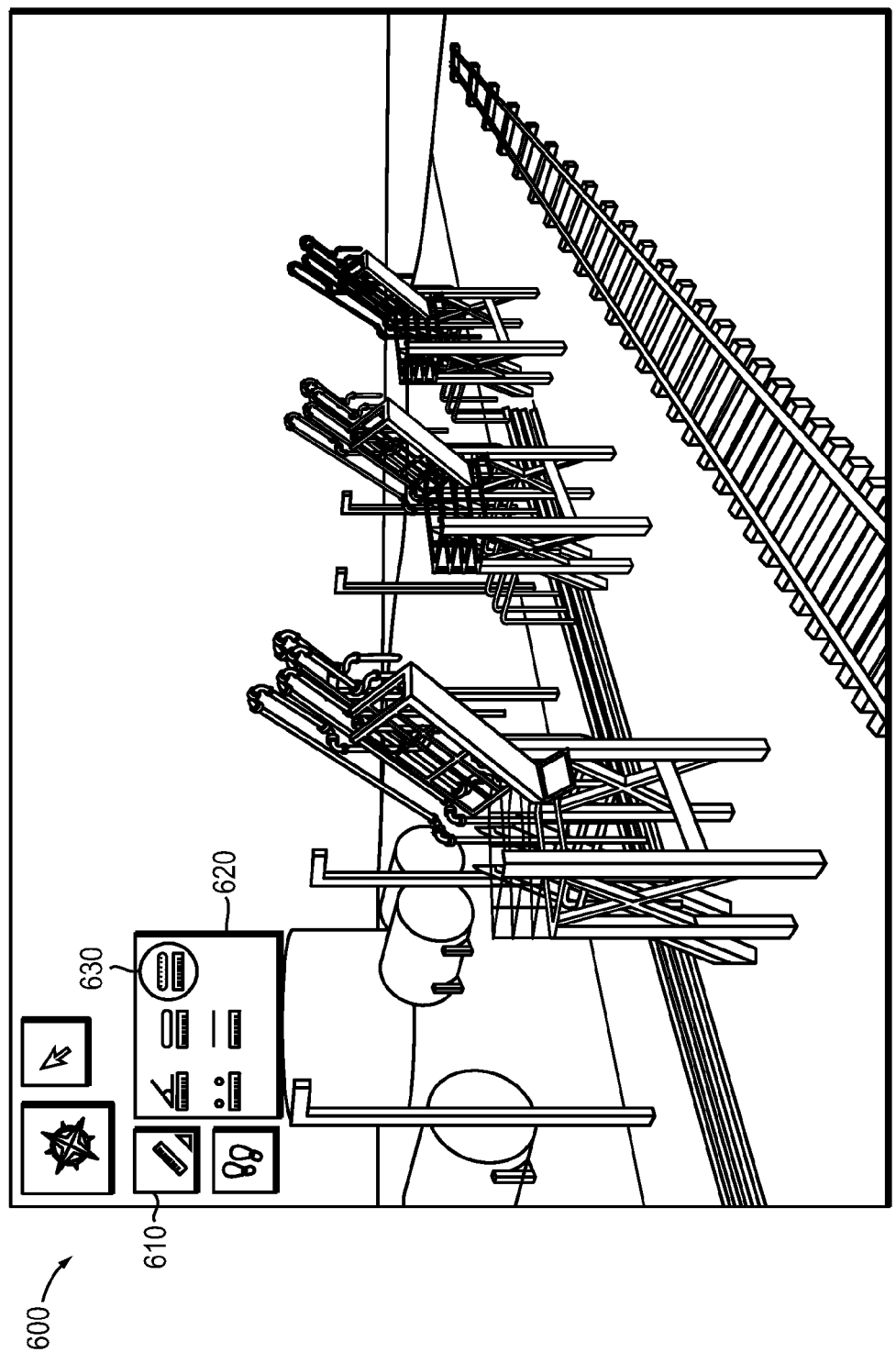
FIG. 6 is a screen shot of a user interface of an example CAD application, illustrating an example first step in measuring the volume of an element.

FIG. 6 is a screen shot 600 of a user interface of an example CAD application, illustrating an example first step in measuring the volume of an element. The user may initially select (e.g., touch) an icon 610 for a measurement tool group to cause a menu 620 to be displayed in the user interface. The user may then select (e.g., touch) an icon for a volume measure tool in the menu 620 (the touch being represented by marker 630). Thereafter, the user may be prompted (not shown) to select an element whose volume is to be measured.

Figure 7:
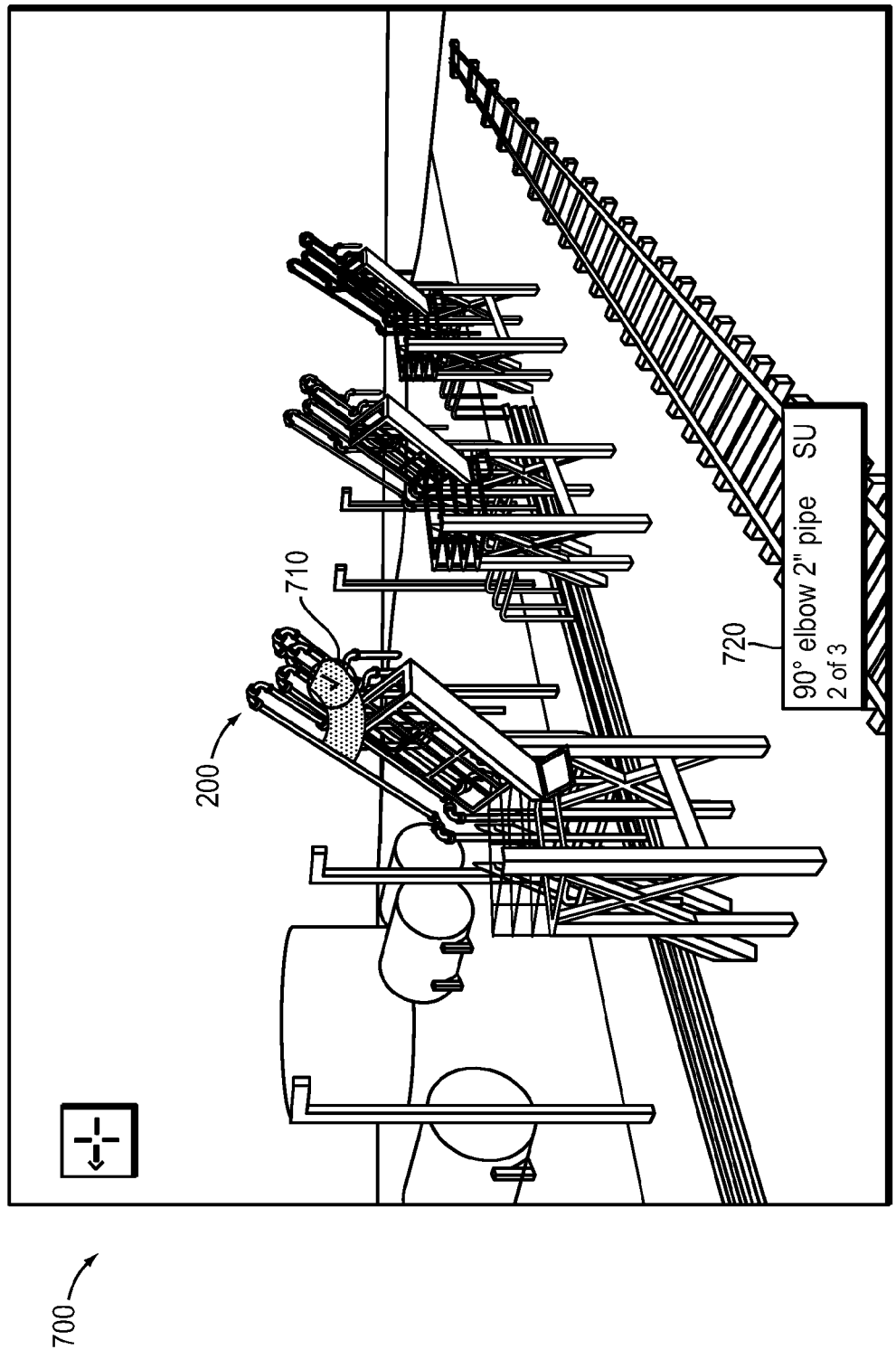
FIG. 7 is a screen shot of the user interface from FIG. 5, updated to show a next step in measuring the volume of an element.

FIG. 7 is a screen shot 700 of the user interface from FIG. 6, updated to show a next step in measuring the volume of an element. The user activates the virtual mouse 200 by entering a precision selection mode. The user may then move the pointer of the virtual mouse to be over an element (in this example, a 90° elbow of a pipe), by interacting with the movement area of the virtual mouse 200. A listing 720 showing the name of the element under the pointer 210 may be displayed. In some cases, if there are multiple elements under the pointer, multiple elements may be displayed in the listing 720, and the user invited to choose between them. Each such element may be highlighted in the user interface. The user may select a particular element by interacting with (e.g., touching) a button of the virtual mouse 200 (the touch being represented by marker 710).

Figure 8:
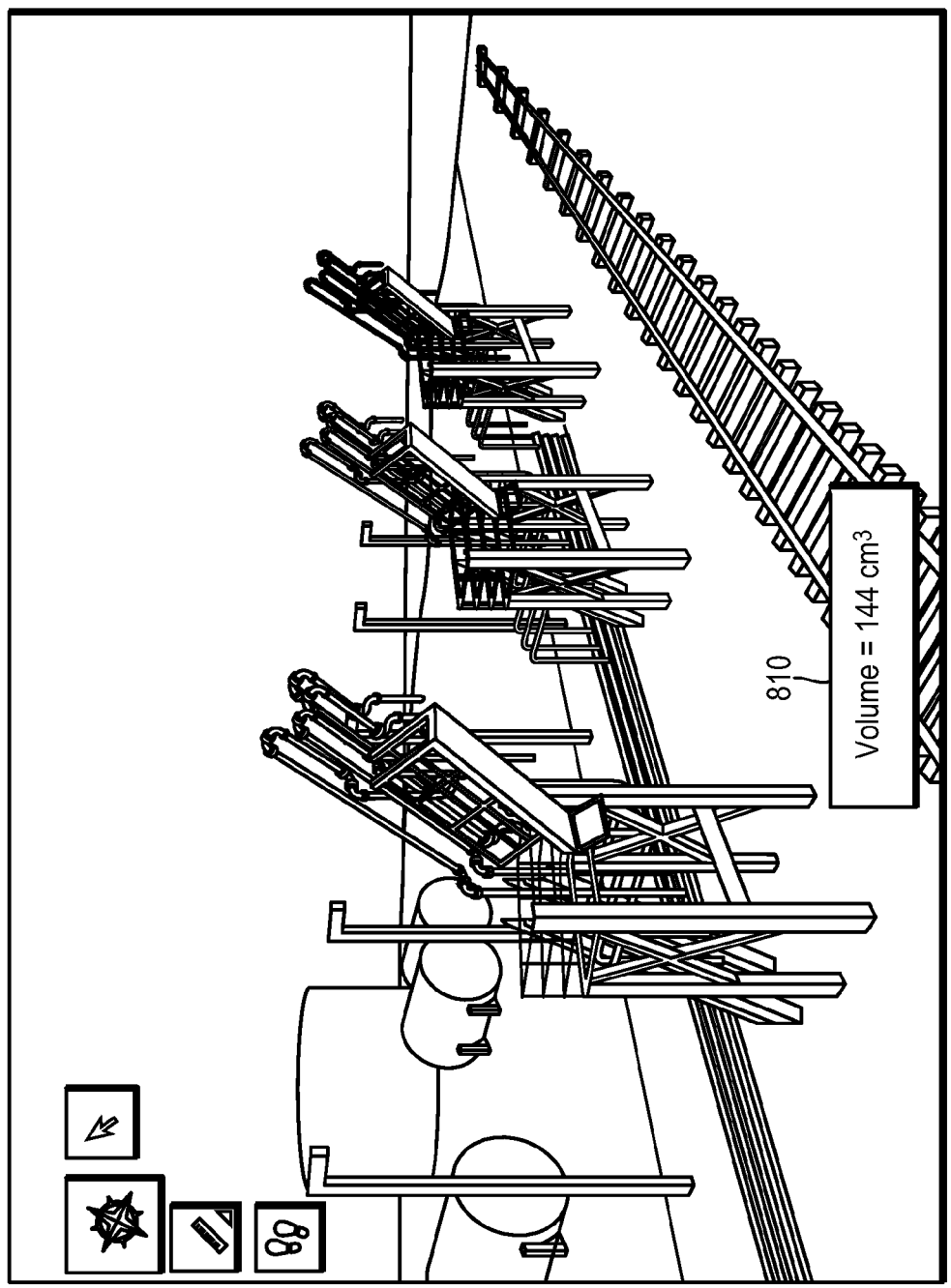
FIG. 8 is a screen shot of the user interface from FIGS. 5 and 6, updated to show the measured volume of a selected element.

FIG. 8 is a screen shot 800 of the user interface from FIGS. 6 and 7, updated to show the measured volume of a selected element. The virtual mouse 200 may be deactivated by exiting the precision selection mode (e.g., automatically upon the element being selected and the volume being measured). The measured volume of the element may be displayed in a text box 810.

Figure 9:
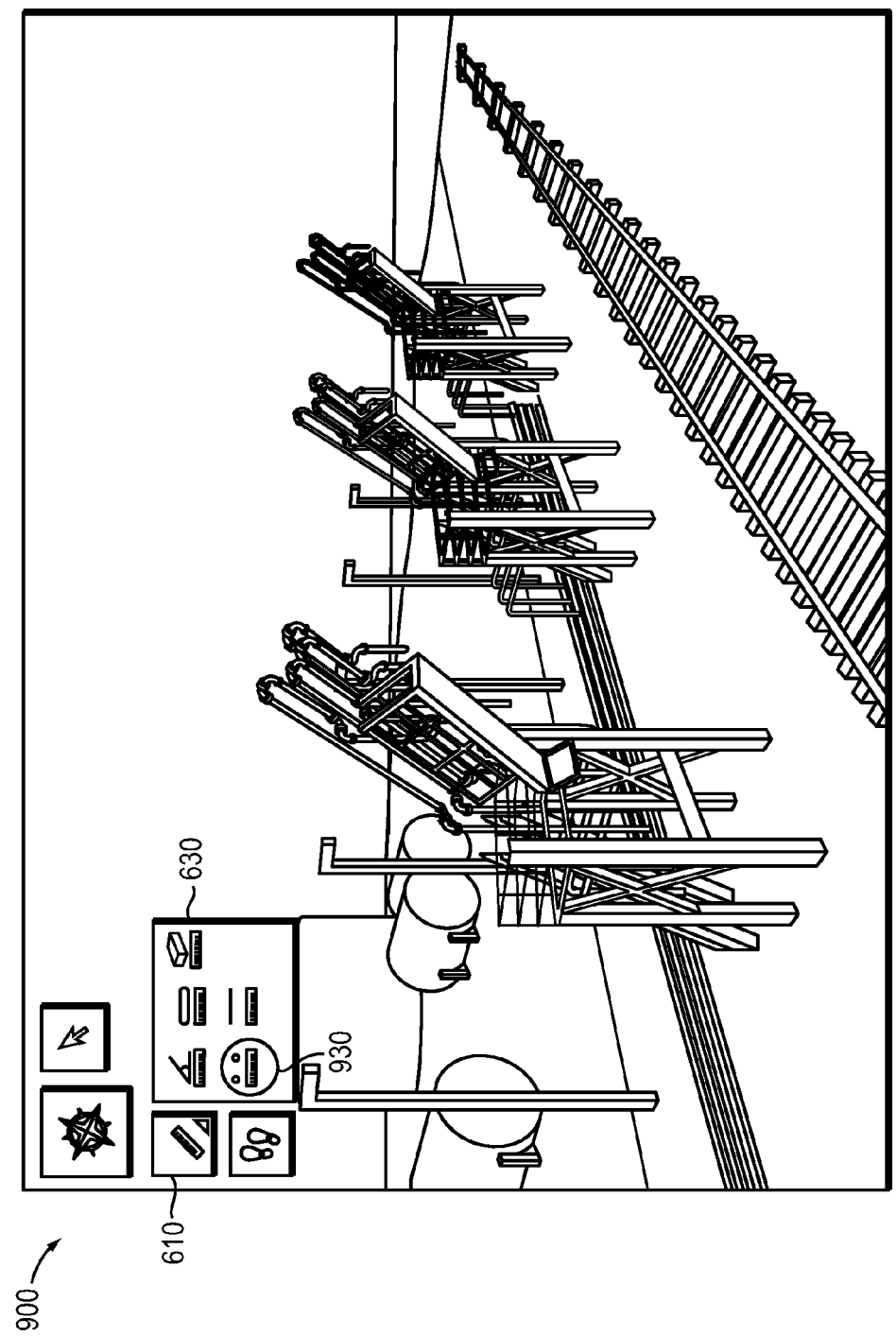
FIG. 9 is a screen shot of a user interface of the example CAD application, illustrating an example first step in measuring a distance between two points.

FIG. 9 is a screen shot 900 of a user interface of an example CAD application, illustrating an example first step in measuring a distance between two points. This time, after the user initially selects (e.g. touches) an icon 610 for the measurement tool group, the user may select (e.g., touch) an icon for a distance measure tool (the touch being represented by marker 930). Thereafter, the user may be prompted (not shown) to select a first point, from which distance is to be measured.

Figure 10:
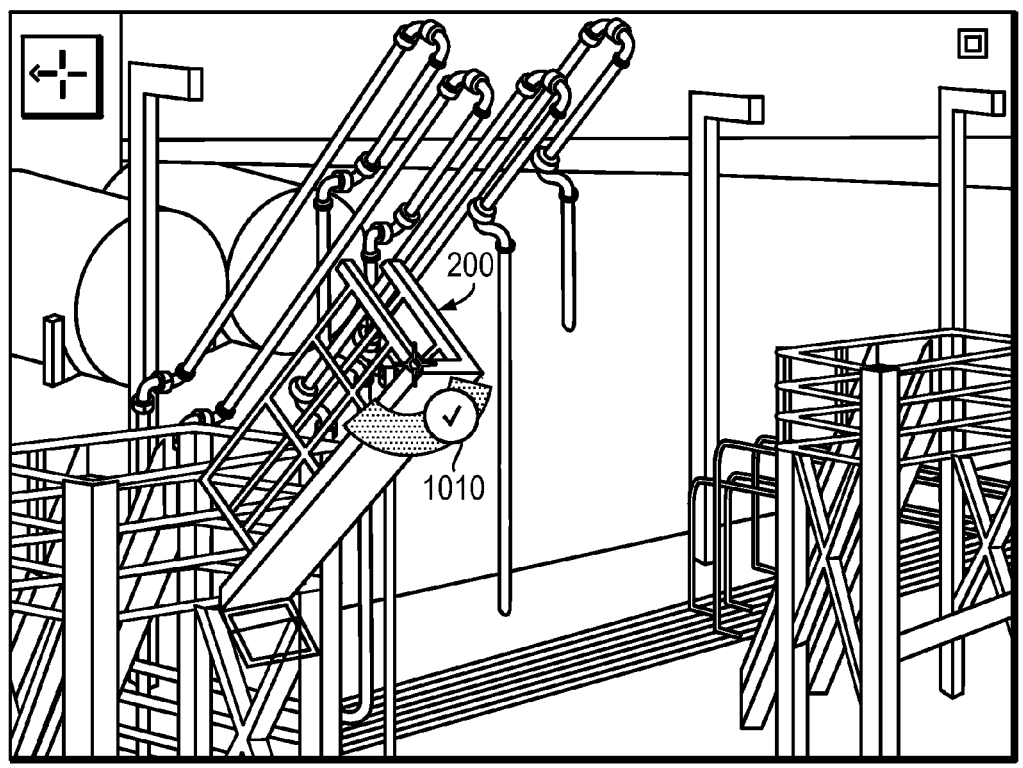
FIG. 10 is a screen shot of the user interface from FIG. 9, updated to show a next step in measuring the distance between two points.

FIG. 10 is a screen shot 1000 of the user interface from FIG. 9, updated to show the next step in measuring the distance between two points. The user again activates the virtual mouse 200 by entering the precision selection mode. The pointer of the virtual mouse 200 may have a different appearance than in FIG. 7, providing a visual reminder that a point, rather than an element is being selected. The user may move the pointer to be over a first point, that distance is measured from, by interacting with the movement area of the virtual mouse 200. The user may then select the first point by interacting with (e.g., touching) a button of the virtual mouse (the touch being resented by marker 1010).

Figure 11:
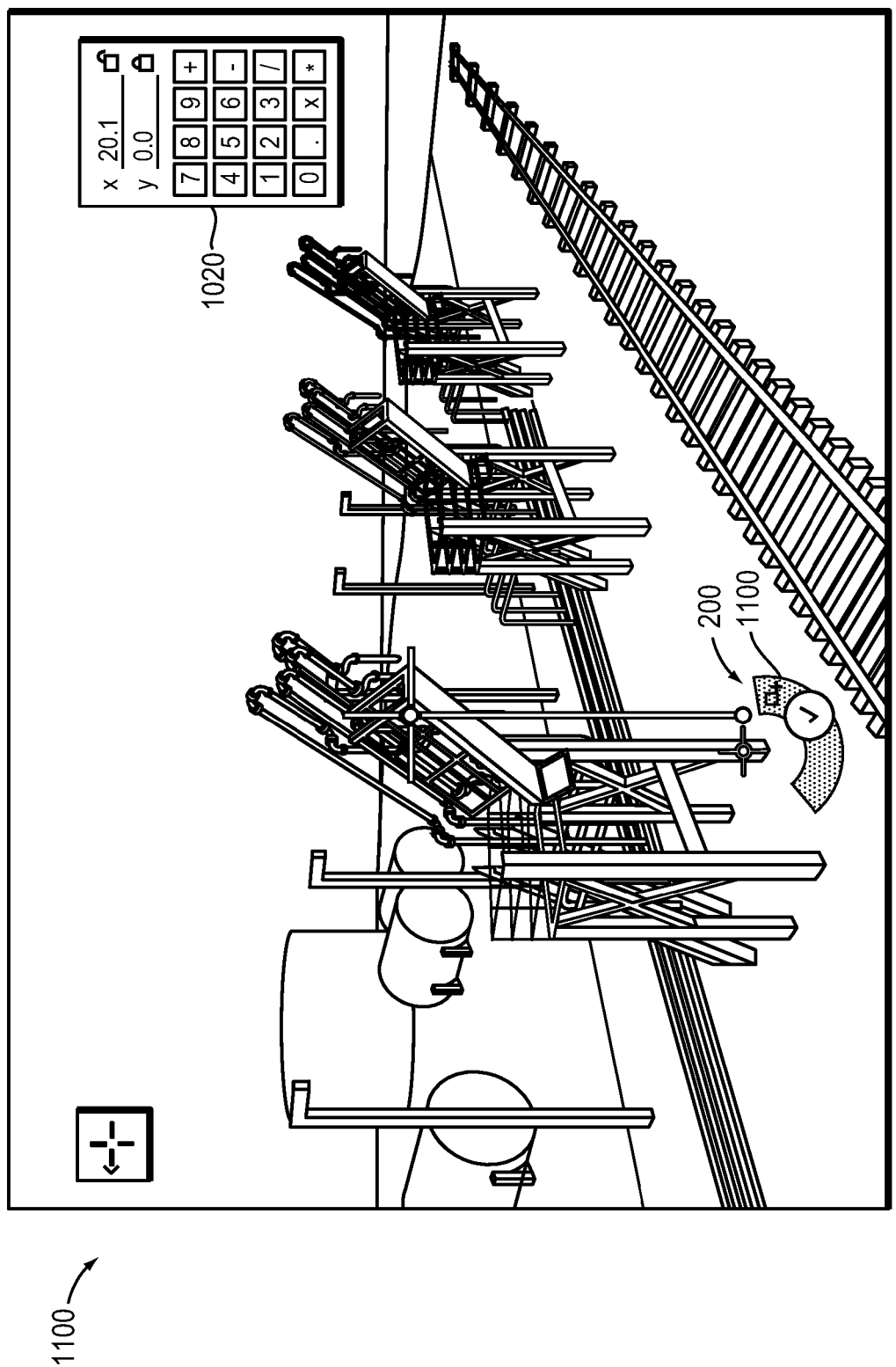
FIG. 11 is a screen shot of the user interface from FIGS. 9 and 10, updated to show still another step in measuring the distance between two points.

FIG. 11 is a screen shot 1100 of the user interface from FIGS. 9 and 10, updated to show still another step in measuring the distance between two points. The user may move the pointer of the virtual mouse 200 to be over a second point, to which distance is measured, by interacting with the movement area of the virtual mouse 200. The user may then select the second point by interacting with (e.g., touching) a button of the virtual mouse (the touch being represented by marker 1110). Additional information 1120, for example coordinates from an origin centered at the first point, may be displayed to the user to assist in selection of the second point.

Figure 12:
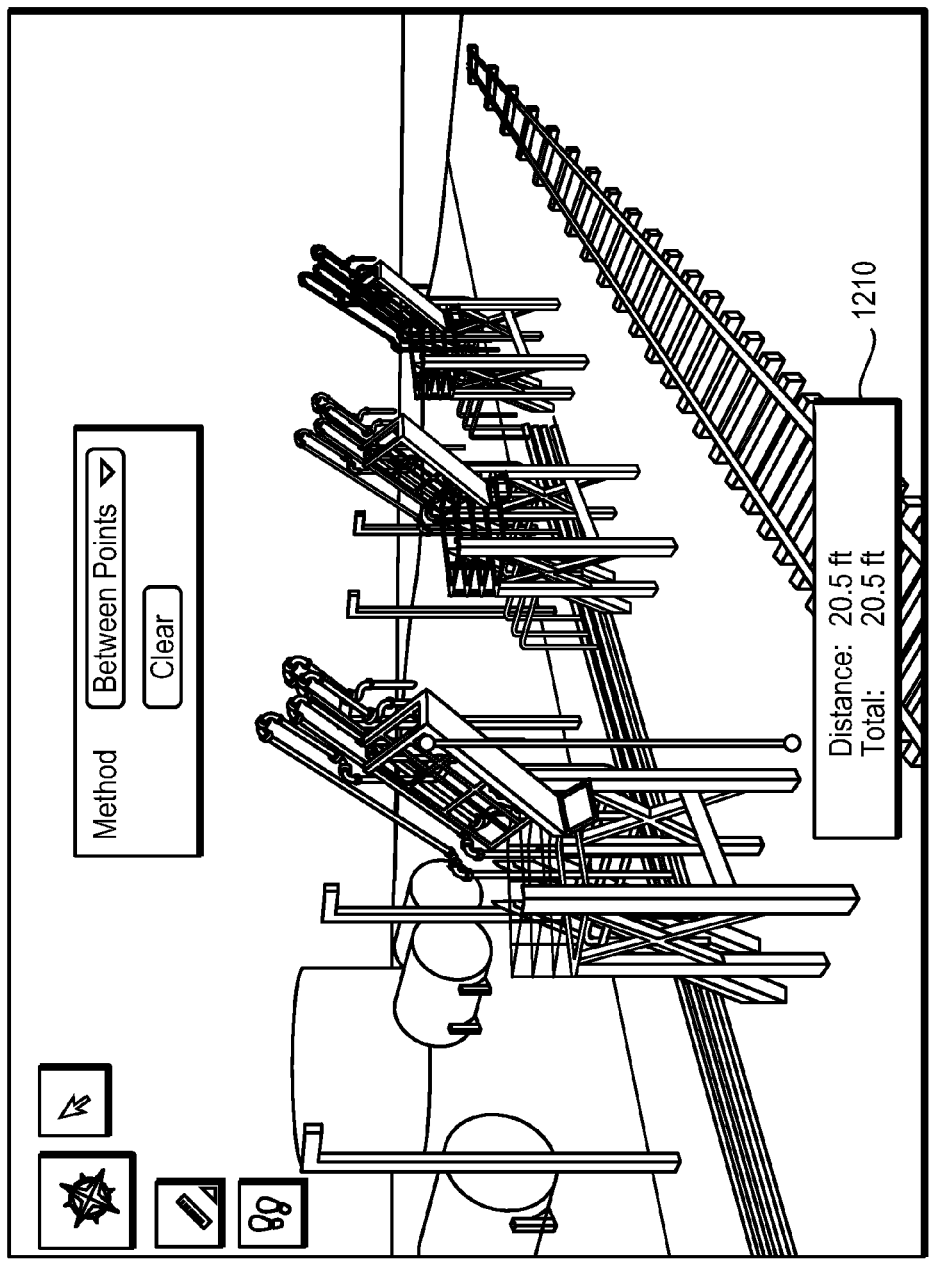
FIG. 12 is a screen shot of the user interface from FIGS. 9-11, updated to show the measured distance between two points.

FIG. 12 is a screen shot 1200 of the user interface from FIGS. 9-11, updated to show the measured distance between the two points. Again, the virtual mouse 200 may be deactivated by exiting the precision selection mode (e.g., automatically upon selection or the second point and the distance being measured). The measured distance may be displayed in a text box 1210.

A wide variety of other uses of the virtual mouse 200 may be possible. It should be understood that a wide variety of modifications and/or additions to what is described above are possible. In general, the above descriptions are meant to be taken only by way of example.

The virtual mouse may achieve several advantages over traditional touch based control techniques. Among its benefits, the virtual mouse may enable more detailed and precise control than generally possible on a touch screen display. Since the virtual mouse provides buttons whose number and functions may vary based on usage, a greater number of input types can be supported than with traditional touch input techniques. Further, the presence of the pointer may provide persistent position tracking, allowing user interface interactions such as "hover over". Still further, by utilizing an offset movement area, the user's view of the pointer is un-obstructed, allowing the user to readily discriminate between nearby items or points.

It should be understood that, depending on the implementation, some or all of these advantages may be achieved. Alternatively other advantages may instead be achieved.

What is claimed is:

1. A method for using a virtual mouse to interact with an electronic device, comprising:
   executing a computer aided design (CAD) application on an electronic device, the CAD application showing a user interface including a view of a CAD model on a touch screen display of the electronic device;
   persistently displaying the virtual mouse within the user interface of the CAD application on the touch screen display of the electronic device, the virtual mouse including
      a pointer identifying a position, and
      a control region positioned proximate to, but offset from, the pointer, the control region extending in an arc about the pointer, the control region including
         a visually defined movement area for receiving touch input that is mapped to movement of the virtual mouse on the touch screen display, the visually defined movement area extending in a first portion of the arc about the pointer and
         a number of buttons disposed in a second portion of the arc about the pointer for performing one or more actions related to an element of the CAD model or a point within the view of the CAD model located at the identified position, the number of the buttons disposed in the second portion of the arc responsive to both a current usage of the virtual mouse within the user interface of the CAD application and the element of the CAD model or point within the view of the CAD model at the position identified by the pointer of the virtual mouse,
   wherein the virtual mouse is displayed independent of receipt of touch input in the visually defined movement area;
   receiving touch input in the visually defined movement area of the virtual mouse;
   moving the virtual mouse, including the pointer, in response to the touch input in the visually defined movement area;
   receiving a button press upon one of the number of buttons of the virtual mouse; and
   causing an action to be performed that is related to the element of the CAD model or point within the view of the CAD model located at the identified position, in response to the button press.

2. The method of claim 1, further comprising:
   activating the virtual mouse prior to the persistently displaying by entering a precision selection mode of the CAD application, the activating to cause the virtual mouse to be displayed within the user interface of the CAD application on the touch screen display; and deactivating the virtual mouse after causing the action to be performed by exiting the precision selection mode of the CAD application, the exiting to cause the virtual mouse to be removed from within the user interface of the CAD application on the touch screen display.

3. The method of claim 2, wherein the activating the virtual mouse is in response to a gesture within the user interface of the CAD application on the touch screen display.

4. The method of claim 3, wherein the gesture is a multi-touch gesture.

5. The method of claim 2, wherein the activating the virtual mouse is in response to a selection in a context menu that is displayed within the user interface of the CAD application about a position of a user's touch on the touch screen display.

6. The method of claim 2, wherein the deactivating the virtual mouse is performed automatically in response to the action being performed.

7. The method of claim 1, wherein the action is to select the element of the CAD model located at the identified position.

8. The method of claim 1, wherein the action is to select the point within the view of the CAD model that is located at the identified position.

9. The method of claim 1, further comprising:
confining the virtual mouse to use within the user interface of the CAD application.

10. The method of claim 1, further comprising:
executing a plurality of other applications on the electronic device, and
allowing the virtual mouse to be moved between the user interface of the CAD application and user interfaces of different ones of the plurality of other applications.

11. The method of claim 1, wherein the electronic device is a mobile device.

12. A mobile device configured to use a virtual mouse, comprising:
a touch screen display that is sensitive to a user's touch;
a processor; and
a memory coupled to the processor and configured to store instructions for a computer aided design (CAD) application and a virtual mouse module, the instructions, when executed by the processor, being operable to:
display a user interface of the CAD application on the touch screen display, the user interface presenting a view of a CAD model,
persistently display the virtual mouse within the user interface of the CAD application on the touch screen display, the virtual mouse including a pointer identifying a position, and a control region positioned proximate to, but offset from, the pointer, the control region including a visually defined movement area for receiving touch input that is mapped to movement of the virtual mouse on the touch screen display, and a number of buttons for performing one or more actions related to an element of the CAD model or a point within the view of the CAD model located at the identified position, the number of the buttons responsive to both a current usage of the virtual mouse within the user interface of the CAD application and the element of the CAD model or point within the view of the CAD model at the position identified by the pointer of the virtual mouse, wherein the virtual mouse is displayed independent of receipt of touch input in the visually defined movement area;
in response to touch input received in the visually defined movement area, move the virtual mouse within the user interface of the CAD application, and
in response to a button press upon one of the number of buttons, cause the CAD application to perform an action related to the element of the CAD model or the point within the view of the CAD model located at the identified position.

13. The mobile device of claim 12, wherein the instructions, when executed by the processor, are further operable to:
activate the virtual mouse by entering a precision selection mode of the CAD application, in response to a gesture on the touch screen display.

14. The mobile device of claim 13, wherein the instructions, when executed by the processor, are further operable to:
automatically deactivate the virtual mouse by exiting the precision selection mode of the CAD application, in response to the action being performed.

15. A non-transitory computer-readable medium that includes software executable on a processor, the software, when executed, being operable to:
persistently display a virtual mouse within a user interface of a computer aided design (CAD) application, the virtual mouse superimposed upon a view of a CAD model within the user interface independent of present touch input, the virtual mouse including
a pointer identifying a position, and
a control region positioned proximate to, but offset from, the pointer, the control region extending in an arc about the pointer, the control region including
a visually defined movement area for receiving touch input that is mapped to movement of the virtual mouse, the visually defined movement area extending in a first portion of the arc about the pointer and having a size that is less than all the touch screen display, and
a number of buttons disposed in a second portion of the arc about the pointer for performing one or more actions related to an element of the CAD model or a point within the view of the CAD model that is located at the identified position, the number of the buttons disposed in the second portion of the arc responsive to both a current usage of the virtual mouse within the user interface of the CAD application and the element of the CAD model or point within the view of the CAD model at the position identified by the pointer of the virtual mouse,
wherein the one or more actions include selecting, deselecting, or changing a setting of the element of the CAD model or the point within the view of the CAD model.

16. The non-transitory computer-readable medium of claim 15, wherein the software, when executed, is further operable to:
activate the virtual mouse in response to a gesture on the touch screen display.

17. The non-transitory computer-readable medium of claim 15, wherein the software, when executed, is further operable to:
automatically deactivate the virtual mouse in response to the action being performed.

18. A method for using a virtual mouse to interact with an electronic device, comprising:
    persistently displaying the virtual mouse on a touch screen display of the electronic device independent of present touch input, the virtual mouse including a pointer identifying a position, and
    a control region positioned proximate to, but offset from, the pointer, extending in an arc about the pointer, the control region including
        a visually defined movement area for receiving touch input that is mapped to movement of the virtual mouse on the touch screen display, the visually defined movement area extending in a first portion of the arc about the pointer, and
        a number of buttons disposed in a second portion of the arc about the pointer, the number of the buttons disposed in a second portion of the arc responsive to both a current usage of the virtual mouse and an item or point located at the identified position;
    moving the virtual mouse, including the pointer, in response to the touch input in the visually defined movement area, to be over the item or point located at the identified position;
    detecting that the pointer is maintained over the item or point for a predetermined period of time;
    causing a first action to be performed that is related to the item or point, in response to the pointer being maintained over the item or point for the predetermined period of time;
    receiving a button press upon one of the number of buttons of the virtual mouse; and
    causing a second action to be performed that is related to the item or point, in response to the button press.

19. The method of claim 18, wherein the first action is displaying a tool tip.

20. A method for using a virtual mouse to interact with an electronic device, comprising:
    persistently displaying the virtual mouse on a touch screen display of the electronic device independent of present touch input, the virtual mouse including
    a pointer identifying a position, and
        a control region positioned proximate to, but offset from, the pointer, the control region extending in an arc about the pointer, the control region including
            a visually defined movement area for receiving touch input that is mapped to movement of the virtual mouse on the touch screen display, the visually defined movement area extending in a first portion of the arc about the pointer, and
            a number of buttons disposed in a second portion of the arc about the pointer for performing one or more actions related to an item or point located at the identified position, the number of the buttons disposed in the second portion of the arc responsive to both a current usage of the virtual mouse within the user interface and the item or point within the view of the CAD model at the position identified by the pointer of the virtual mouse;
    receiving touch input in the visually defined movement area of the virtual mouse;
    moving the virtual mouse, including the pointer, in response to the touch input in the visually defined movement area;
    receiving a button press upon one of the number of buttons of the virtual mouse; and
    causing an action to be performed that is related to the item or point located at the identified position, in response to the button press.

21. The method of claim 20, further comprising:
    activating the virtual mouse prior to the persistently displaying, to cause the virtual mouse to be displayed on the touch screen display; and
    deactivating the virtual mouse after causing the action to be performed, to cause the virtual mouse to be removed from the touch screen display.

22. The method of claim 21, wherein the activating the virtual mouse is in response to a gesture on the touch screen display.

23. The method of claim 21, wherein the activating the virtual mouse is in response to a selection in a context menu that is displayed about a position of a user's touch on the touch screen display.

24. The method of claim 21, wherein the deactivating the virtual mouse is performed automatically in response to the action being performed.

* * * * *